US007013392B1

(12) United States Patent
Sasaki et al.

(10) Patent No.: US 7,013,392 B1
(45) Date of Patent: Mar. 14, 2006

(54) FILE PROCESSING UNIT

(75) Inventors: Takaoki Sasaki, Tokyo (JP); Takeshi Hatano, Tokyo (JP); Ryota Akiyama, Kawasaki (JP); Seigo Kotani, Kawasaki (JP); Takayuki Hasebe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/559,138

(22) Filed: Apr. 27, 2000

(30) Foreign Application Priority Data

Apr. 30, 1999 (JP) .......................................... 11-125010

(51) Int. Cl.
*G06F 12/14* (2006.01)

(52) U.S. Cl. ....................... 713/187; 713/165; 713/176; 713/193

(58) Field of Classification Search ................ 713/165, 713/176, 187, 193
See application file for complete search history.

(56) References Cited

U.S. PATENT DOCUMENTS

| | | | | | |
|---|---|---|---|---|---|
| 5,050,212 | A | * | 9/1991 | Dyson | 713/187 |
| 5,956,481 | A | * | 9/1999 | Walsh et al. | 713/200 |
| 6,047,342 | A | * | 4/2000 | Depew | 710/301 |
| 6,185,681 | B1 | * | 2/2001 | Zizzi | 713/165 |
| 2002/0002681 | A1 | | 1/2002 | Kawano et al. | 713/180 |

FOREIGN PATENT DOCUMENTS

| | | | |
|---|---|---|---|
| EP | 0 816 967 | A2 | 1/1998 |
| EP | 0 837 383 | A2 | 4/1998 |
| JP | 11-39219 | A | 2/1999 |

* cited by examiner

*Primary Examiner*—Justin T. Darrow
(74) *Attorney, Agent, or Firm*—Greer, Burns & Crain, Ltd.

(57) ABSTRACT

A file processing unit comprises a first signature information producing unit that produces first signature information in accordance with a predetermined rule utilizing the data of a file designated by a file close request issued in an application used in a computer system, and a signature information storage control unit that stores the first signature information, correlated with the file designated by the file close request, in a storage unit.

17 Claims, 10 Drawing Sheets

FIG.9

| OPEN | CLOSE | WRITE | READ | MODE VALUE |
|---|---|---|---|---|
| SIGNATURE CHECK | SIGNATURE PRODUCTION | ENCRYPTION COMPRESSION | DECRYPTION EXPANSION | ——— |
| × | × | × | × | 0 |
| × | × | × | ○ | 1 |
| × | × | ○ | × | 2 |
| × | × | ○ | ○ | 3 |
| × | ○ | × | × | 4 |
| × | ○ | × | ○ | 5 |
| × | ○ | ○ | × | 6 |
| × | ○ | ○ | ○ | 7 |
| ○ | × | × | × | 8 |
| ○ | × | × | ○ | 9 |
| ○ | × | ○ | × | 10 |
| ○ | × | ○ | ○ | 11 |
| ○ | ○ | × | × | 12 |
| ○ | ○ | × | ○ | 13 |
| ○ | ○ | ○ | × | 14 |
| ○ | ○ | ○ | ○ | 15 |

FIG.10

| MODE VALUE | FOLDER |
|---|---|
| 0 | A |
| 1 | B |
| 2 | C |
| 3 | D |
| 4 | E |
| 5 | F |
| 6 | G |
| 7 | H |
| 8 | I |
| 9 | J |
| 10 | K |
| 11 | L |
| 12 | M |
| 13 | N |
| 14 | O |
| 15 | P |

FILE PROCESSING UNIT

BACKGROUND OF THE INVENTION

1. Field of the Invention

The present invention generally relates to file processing units that perform processes such as file open, file close, read, and write, based on accesses made to an external storage device by an application, and, more particularly, to a file processing unit that produces and checks signature information for a designated file.

2. Description of the Related Art

In order to determine whether the data in a file produced utilizing a computer system and stored in an external storage (such as hard disk, optical disk, or floppy disk) has been altered by a third party, signature data is affixed to the file and then checked. Conventionally, such signature data has been produced and checked by means of a special application. More specifically, such signature data is produced and checked in the following manner.

After a file produced by an application is stored in an external storage, a special application designed for producing and checking signature data is started. The file is then read out of the external storage in accordance with the special application, and signature data is produced utilizing all or a part of the data of the read out file. The signature data attached to the corresponding read out file is again stored in the external storage. When the data of the file stored in the external storage in accordance with the special application is to be edited, the special application is started before the file is accessed. In accordance with the special application, the data of the designated file is read out of the external storage, and signature data is produced utilizing all or a part of the data of the designated file. The signature data produced here is then compared with the signature data already attached to the designated file. If both signature data are identical, it is determined that the data in the designated file has not been altered. If the signature data are not identical, it is determined that the data in the designated file has been altered after the older signature data was produced.

Based on the signature data result, a user can determine whether the data of the designated file has been altered. After the determination, the user reads the data of the designated file from the external storage, and performs processes such as editing.

In the conventional system described above, every time a file is processed by an application, it is necessary to start the special application for producing and checking signature data. This makes the signature producing and checking procedure complicated and troublesome.

SUMMARY OF THE INVENTION

A general object of the present invention is to provide file processing units in which the above disadvantages are eliminated.

A more specific object of the present invention is to provide a file processing unit which can produce or check a signature when accessing a file stored in an external storage unit through any application.

The above objects of the present invention are achieved by a file processing unit comprising:

a first signature information producing unit that produces first signature information, in response to a close request to close a file, using the data of the file in accordance with a predetermined rule, the file being used in an application that is run in a computer system; and a signature information storage control unit that correlates the first signature information with the file designated by the close request, and stores the first signature information in a storage unit.

In this file processing unit, it is not necessary to start an application especially designed for producing signature information. When a close request to close a file used in any application is issued, the first signature information is produced utilizing the data of the file, and is stored, together with the file designated by the close request, in the storage unit. Thus, signature information can be easily produced when a file used in any application is closed.

The above objects of the present invention are also achieved by a file processing unit comprising:

a second signature information producing unit that produces second signature information, in response to an open request to open a file, using the data of the file in accordance with a predetermined rule, the file being used in an application that is run in a computer system;

a signature agreement determining unit that determines whether the second signature information is identical to first signature information produced utilizing the data of the file designated by the open request and stored, attached to the designated file, in a storage unit; and a determination result producing unit that produces information representing a determination result of the signature agreement determining unit, the information being supplied to the application.

In this file processing unit, it is not necessary to start an application especially designed for producing signature information. When an open request to open a file used in any application is issued, the first signature information stored together with the file designated by the open request in the storage unit is compared with the second signature information produced utilizing the data of the file designated by the open request. A result information is then produced based on the comparison result. Thus, signature information can be easily produced when a file used in any application is opened.

The above objects of the present invention are also achieved by a file processing unit that is applied to a computer system having a file system that performs processes on a file based on an event issued from an application, the file processing unit comprising:

a first signature information producing unit that produces first signature information in accordance with a predetermined rule using the data of a file designated by a file close event issued from the application, before a process specified by the file close event is completed in the file system;

a signature information storage control unit that attaches the first signature information to the file designated by the file close event, and stores the first signature information in a storage unit: and a first returning unit that performs, after the first signature information is produced, a process for returning to the process for the file specified by the file close event in the file system.

When the file system in the computer system performs in accordance with a file close event, this file processing unit receives the file close event, and produces the first signature information utilizing the data of the file designated by the file close event. The first signature information is stored, together with the file, in the storage unit. The file processing unit then performs a return process for returning to the process for the file specified by the file close event in the file system. Accordingly, while the file system and the application perform the process specified by the file close event, the first signature information is automatically produced, and is stored, together with the file designated by the file close event, in the storage unit.

The above objects of the present invention are also achieved by a file processing unit that is applied to a computer system having a file system that performs processes on-a file based on an event issued from an application, the file processing unit comprising:

a second signature information producing unit that produces second signature information in accordance with a predetermined rule using the data of a file designated by a file open event issued from the application, before a process specified by the file open event is completed in the file system;

a signature agreement determining unit that determines whether the second signature information is identical to first signature information produced in accordance with the predetermined rule using the data of the file designated by the file open event and stored, together with the designated file, in a storage unit;

a determination result producing unit that produces information representing a determination result of the signature agreement determining unit, the information being supplied to the application; and a second returning unit that passes the information representing the determination result to the file system, and performs a process for returning to the process for the file specified by the file open event in the file system.

When the file system in the computer system performs in accordance with a file close event, this file processing unit receives the file open event, and produces the second signature information utilizing the data of the file designated by the file open event. The second signature information is compared with the first signature information stored together with the file in the storage unit. The file processing unit then sends the comparison result to the file system, and performs a return process for returning to the process for the file specified by the file open event in the file system. Accordingly, while the file system and the application perform the process specified by the file open event, the second signature information is automatically produced, and is compared with the first signature information already produced for the file.

The above and other objects and features of the present invention will become more apparent from the following description taken in conjunction with the accompanying drawings.

BRIEF DESCRIPTION OF THE DRAWINGS

FIG. 9 shows an example mode table used in the system of FIG. 1; and

FIG. 10 shows the relationship between folders and processing modes used in the system of FIG. 1.

DESCRIPTION OF THE PREFERRED EMBODIMENTS

The following is a description of embodiments of the present invention, with reference to the accompanying drawings.

Figure 1:
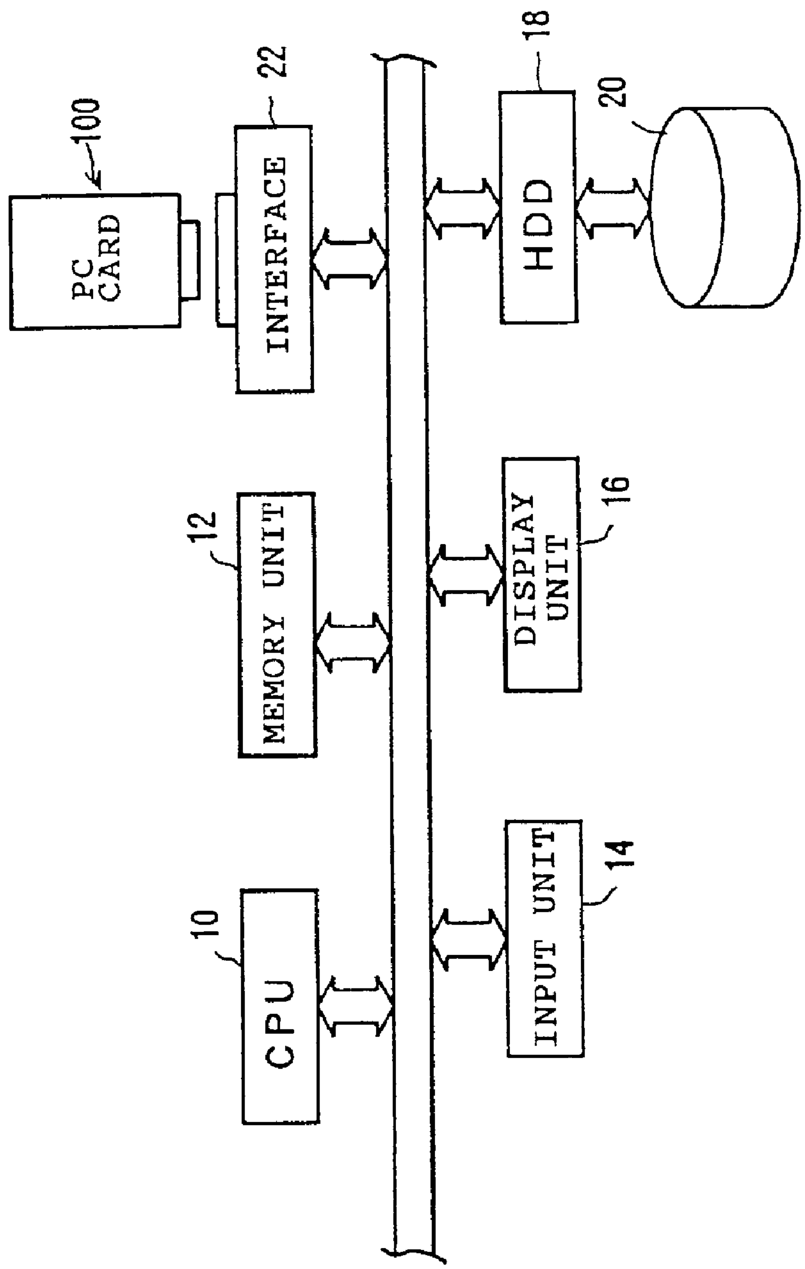
FIG. 1 is a block diagram showing the hardware structure of a computer system to which a file processing unit of the present invention is applied.

FIG. 1 shows the structure of a computer system to which a file processing unit of an embodiment of the present invention is applied.

In FIG. 1, the system comprises a CPU 10, a memory unit 12, an input unit 14, a display unit 16, a hard disk drive unit (HDD) 18, and an interface circuit 22. The units 10 to 18 and the interface circuit 22 are all connected to a bus.

The memory unit 12 stores an operation system (OS) and various applications, and the CPU 10 performs an operation in accordance with the OS stored in the memory unit 12 and runs a selected application. The input unit 14 includes a mouse and a keyboard, and is used to select an application, input data into a file opened by a selected application, set necessary modes, and input other necessary information.

The display unit 18 displays various control pages and information of a file opened by an application. The hard disk drive unit 18 drives a hard disk 20. In compliance with instructions issued from the CPU 10 based on a selected application and the OS, the hard disk drive unit 18 stores files in the hard disk 20 or reads files out of the hard disk 20.

A PC card 100 is connected to the interface circuit 22. The PC card 100 contains a driver as a file processing unit of the present invention. The interface circuit 22 interfaces the driver in the PC card 100 with an application run by the CPU 10 or a file system built in the OS.

Figure 2:
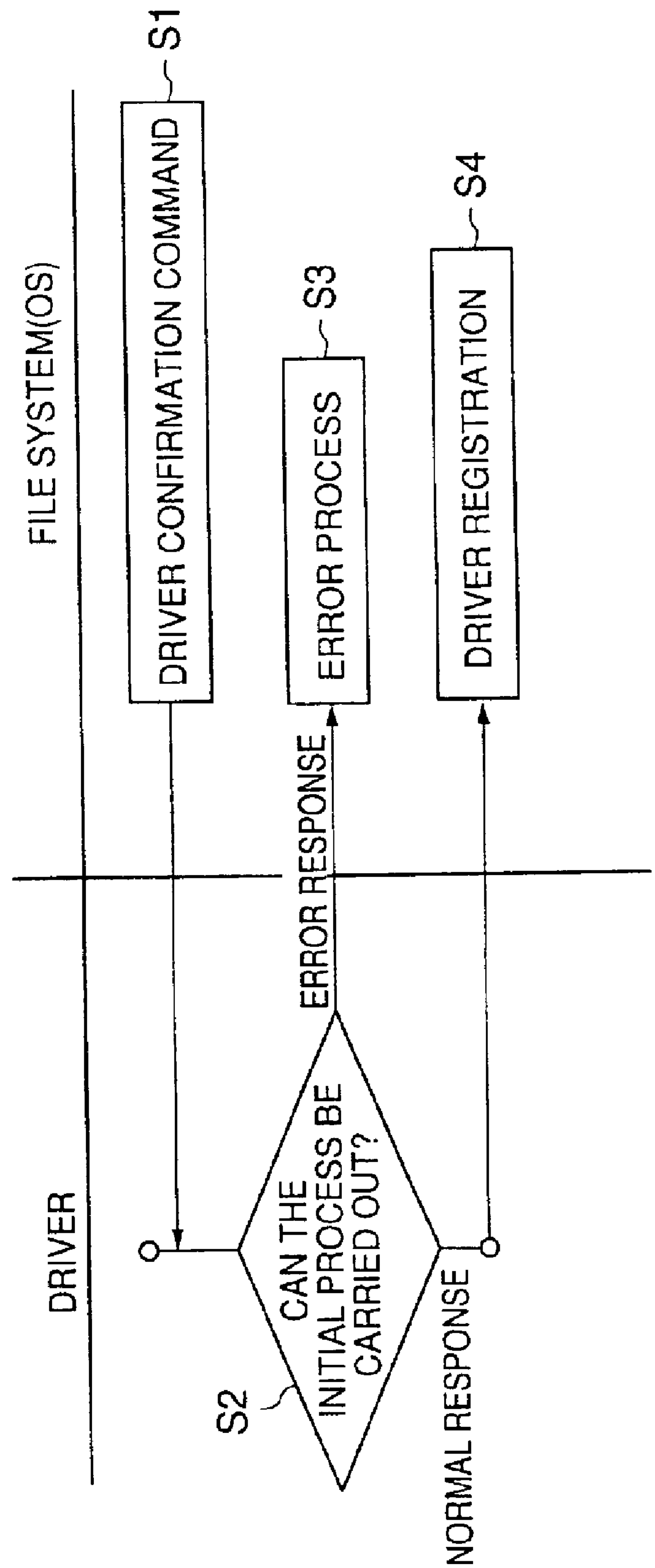
FIG. 2 is a flowchart of a driver registration process carried out between a driver and a file system (OS) in the system of FIG. 1.

When the PC card 100 is set to the interface circuit 22 after the above computer system is started, an initial process is carried out between a file system built in the OS and the driver in the PC card 100 in a manner shown in FIG. 2. FIG. 2 is a flowchart of a driver registration process carried out between the file system and the driver. In step S1, the file system sends a driver confirmation command to the driver. In step S2, it is determined whether the initial process can be carried out in the driver. If the initial process cannot be carried out in the driver, the driver sends an error response to the file system. In step S3, upon receipt of the error response, the driver performs a predetermined error process, in which an error message indicating that the driver cannot be started is displayed on the display unit 16.

If the initial process can be started in the driver, the driver sends a normal response to the file system. In step S4, upon receipt of the normal response, the file system registers the information representing the driver in the memory unit 14. The file system then outputs a message indicating that the driver has been registered. The message is displayed on the display unit 16.

Figure 3:
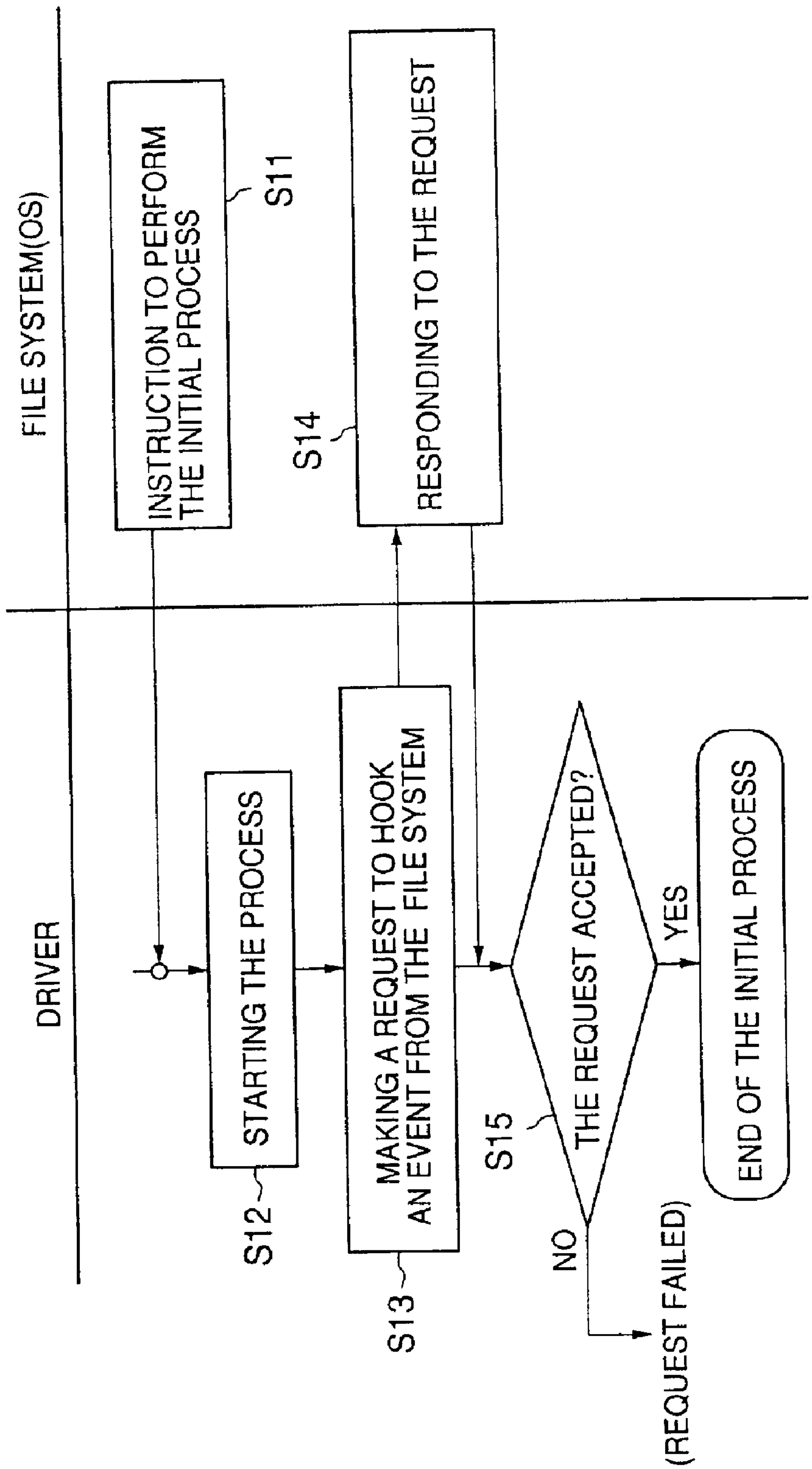
FIG. 3 is a flowchart of an initial process carried out between the driver and the file system in the system of FIG. 1.

After the driver in the PC card 100 has been registered with the PC card 100 being connected to the interface circuit 22, a process is carried out according to the procedure shown in FIG. 3. In step S11, the file system in which the driver has been registered instructs the driver to carry out the initial process. Upon receipt of the instruction, the driver starts the initial process in step S12, and sends a request to the file system to transfer an event from the application to the driver in step S13.

If the request is acceptable. the file system registers an address (hook address) to be designated for transferring an event to the driver in step S14. On the other hand, if the initial process in the driver is incomplete, or if the file system fails to receive the request from the driver, the file system sends a request error response to the driver in step S14.

Upon receipt of the request error response, the driver determines whether the request error response is an allowance response or an error response in step S15. If the request error response is an allowance response, the initial process can be properly completed. If the request error response is an error response, on the other hand, the initial process is again carried out, or a predetermined error process is carried out.

Figure 4:
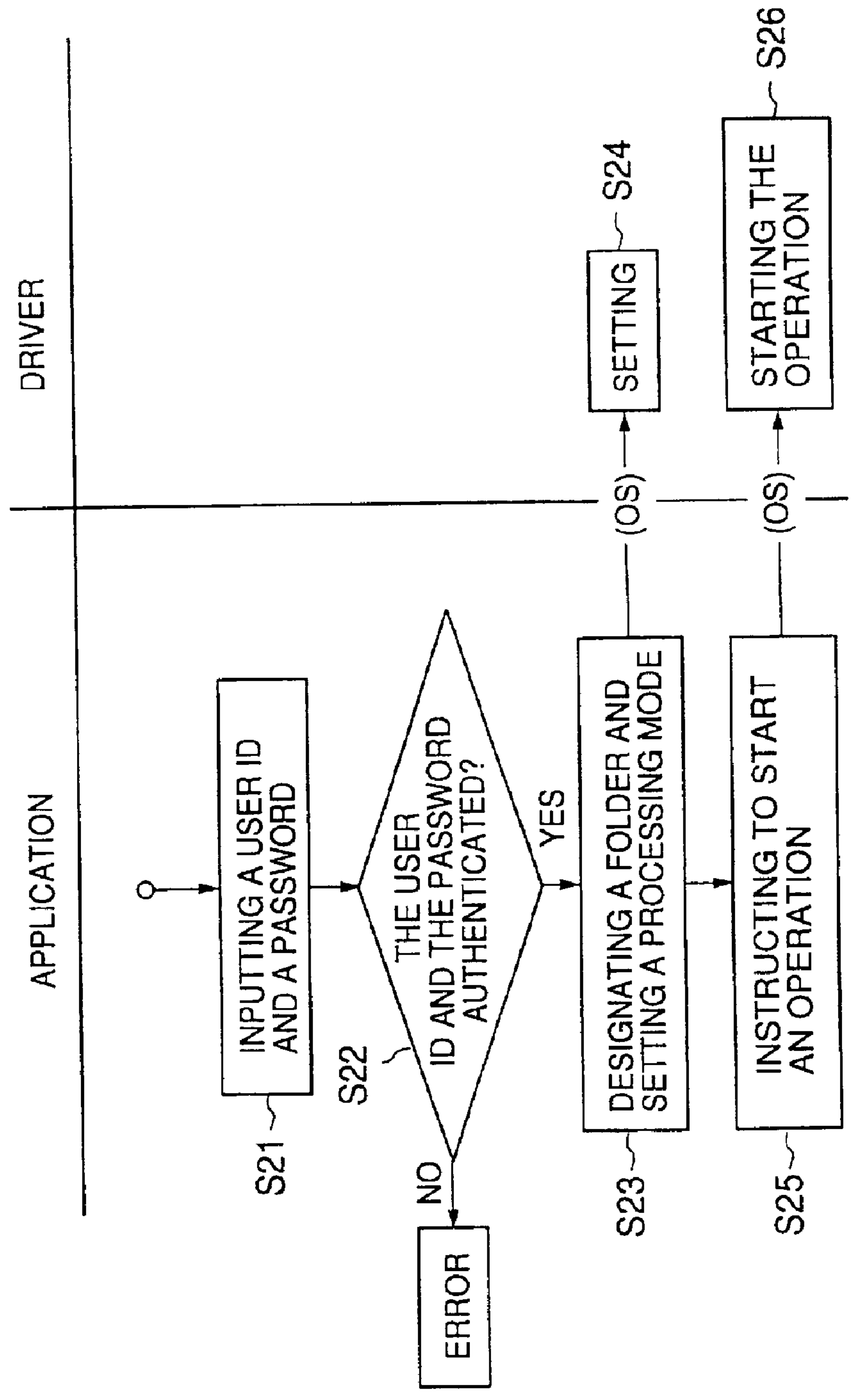
FIG. 4 is a flowchart of a process of authentication and mode setting between an application and the driver in the system of FIG. 1.

After the registration of the driver and the completion of the initial process, a user can designate an application through the input unit 14. The designated application is then transferred from the hard disk 20 to the memory unit 12 via the hard disk drive unit 18. When the application is started, a process of user authentication and mode setting is carried out according to the procedure shown in FIG. 4.

In the started application, a user ID and password input page is displayed on the display unit 16. When a user inputs a user ID and a password through the input unit 14, the application acquires the user ID and the password in step S21, and checks the user ID and the password in step S22. If the user has not been authenticated, a predetermined error process is performed.

If the user has been authenticated by means of the user ID and the password, the application sends a folder and a processing mode (a mode value) designated by the user through the input unit 14 to the driver via the OS in step S23. Here, the processing mode is one of 16 processing modes that are predetermined based on whether or not a signature check is carried out when a file is opened, whether or not a signature is produced when a file is closed, whether or not data is encrypted and compressed when a write process is performed, and whether or not data is decrypted and expanded when a read process is performed. The relationship between the mode values and the processes shown in FIG. 9 is stored as a mode table in advance in the memory in the driver.

After the processing mode setting and folder designation, the processing modes and the folders are correlated with each other, and are stored in the form of a table shown in FIG. 10 in the memory in the driver. By defining the relationship between the processing modes and the folders, the files to be carried out in each processing mode are stored in each corresponding folder.

After the processing mode setting and folder designation, the application sends a process start instruction to the driver via the OS in step S25. Upon receipt of the instruction, the driver starts an operation in a processing mode determined based on an event (open event, close event, read event, or write event) issued from the application in step S26.

Referring now to FIGS. 5 to 8, an example, in which the mode value is set at 15 (see FIG. 9) and a folder P (see FIG. 10) is designated, will be described.

Figure 5:
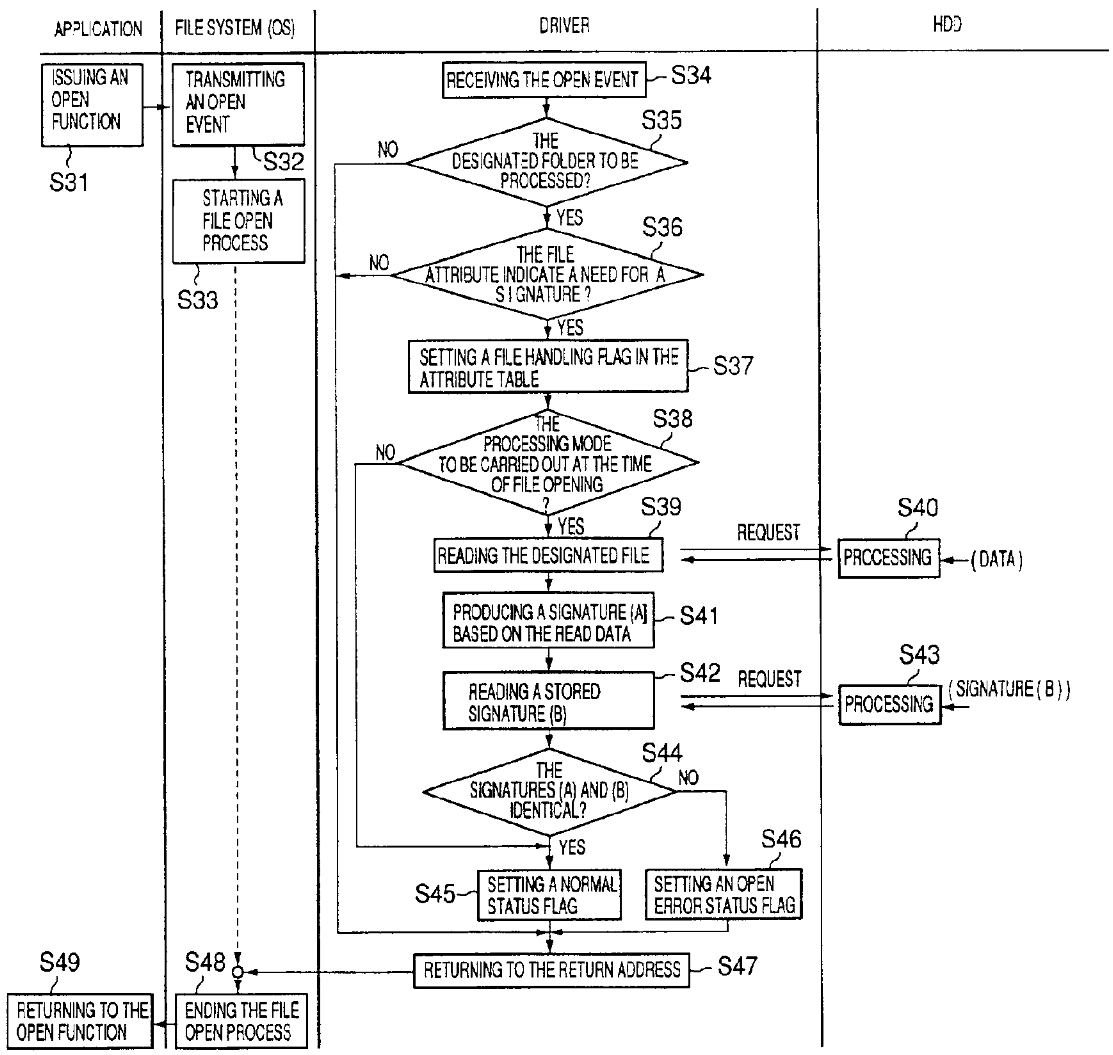
FIG. 5 is a flowchart of a file open process carried out among an application, the file system, the driver, and the hard disk drive unit in the system of FIG. 1.

When a user opens a file to process the data in the file while the application and the driver are in operation, the file open process is carried out according to the procedure shown in FIG. 5.

In step S31, an open function is issued from the application, and is passed to the file system (OS). The file system passes a hook address and an open event to the registered driver in step S32, and starts the file open process in step S33. The open event includes: the name of a designated folder; a file name (including a path name); file attribute; the parameter of the open function; and a return address in the file system.

In step S34, the driver receives the open event and then moves on to the subsequent steps.

In step S35, the designated folder is checked. In this step, it is determined whether the designated folder is registered as a folder that stores files to be processed by the driver, with reference to the table shown in FIG. 10. In this example, since the designated folder P is registered as a folder to be processed, the driver checks the file attribute, referring to an attribute table (not shown) in step S36. The file attribute check is carried out to determine whether a signature producing process or an encryption process can be performed on the file. Attribute values that indicate neither signature producing process nor encryption process can be performed are assigned to the system file, hidden files, and driver files.

If the designated file is not to be provided with a signature or encrypted, a file handling flag indicating that the designated file is being processed is stored in the attribute table in step S37. Referring to the mode table, it is determined whether the set processing mode is a mode for performing the process when a file is opened in step S38. As the mode value is 15 in this example, the set processing mode is determined to be a processing mode for carrying out a signature check when the file is opened.

The driver then outputs a request to read the designated file to the hard disk drive unit 18 in step S39. In response to this request, the hard disk drive unit 18 reads the data of the designated file from the hard disk 29, and sends the data to the driver in step S40.

Upon receipt of the data from the hard disk drive unit 18, the driver produces signature data (A) using all or a part of the received data in accordance with a predetermined rule in step S41. The driver then outputs a request to read signature data (B) allocated to a different region from the data region of the designated file to the hard disk drive unit 18 in step S42. In response to this request, the hard disk drive unit 18 reads the signature data (B) from a predetermined region of the designated file in the hard disk 20, and sends the signature data (B) to the driver in step S43.

Upon receipt of the signature data (B) from the hard disk drive unit 18, the driver compares the signature data (B) with the signature data (A) to determine whether they are identical in step S44. If the signature data (A) and the signature data (B) are identical, a normal status is set in step S45. The driver then passes the normal status to the file system, and returns to the return address in the file system in step S47.

The file system then continues the file open process at the return address, and confirms the normal status sent from the driver before completing the file open process in step S48. The file system passes the result (such as the data of the file to be opened) of the file open process to the application. Upon receipt of the result of the file open process, the application returns to the open function in step S49. As a result, the file designated by the user is opened by the application.

If the existing signature data (B) and the newly produced signature data (A) are determined not to be identical in step S44, the driver sets an open error in step S46, and sends the open error status to the file system when returning the return address in the file system. In this case, the file system confirms the open error status and ends the file open process in step S48. The file system then passes the open error status as well as the result of the file open process to the application. As a result, the application returns to the open function, and the file is opened together with a message indicating that the data in the file might have been altered.

In the above process based on the open event, if the designated folder is not to be checked for its signature when a file is opened, or if the designated file has an attribute that does not need a signature, the driver performs the return process without carrying out the signature check in the S47.

As described above, when the open function is issued from the application to the file system, the driver automatically carries out the signature check, and sends the check result to the file system. The file system then performs the normal file open process, and returns the results of the file open process and the signature check to the application. Accordingly, the user can obtain the result of a signature check on a file to be opened simply by setting a processing mode when a file is opened with a desired application in operation, without starting an application especially designed for checking signatures.

Figure 6:
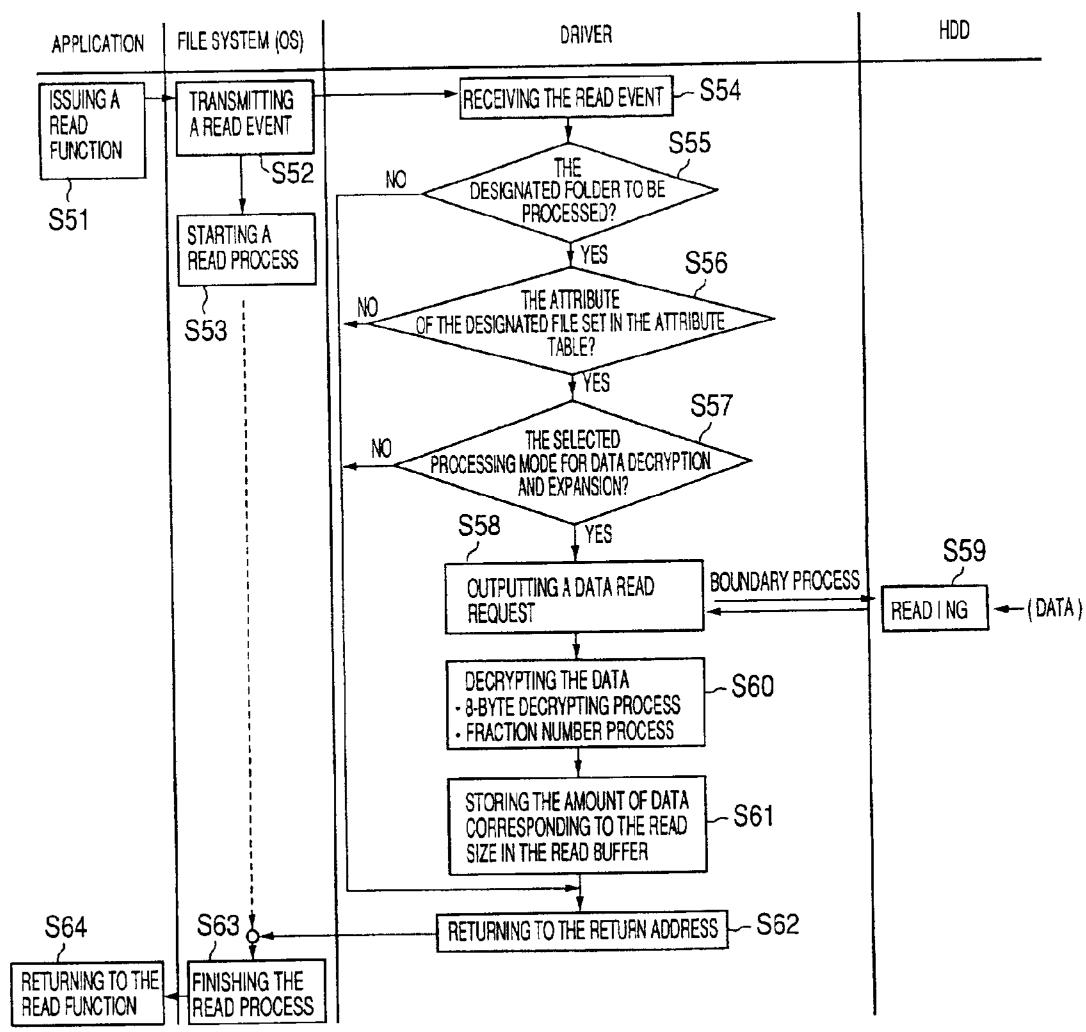
FIG. 6 is a flowchart of a read process carried out among an application, the file system, the driver, and the hard disk drive unit in the system of FIG. 1.

The flowchart of FIG. 6 illustrates a read process to be performed on the file opened in the above described manner.

As shown in FIG. 6, in step S51, a read function is issued from the application to the file system. Upon receipt of the read function, the file system transmits a read event to the driver in step S52, and starts the read process in step S53. The driver receives the read event in step S54, and carries out the subsequent processes. Here, the read event includes: a file name (including a path name); a file handling flag; a read point; a read buffer; read size; and a return address in the file system.

After the folder is checked in step S55 in the same manner as in the file open process, the file attribute is checked in step S56. In the folder checking step, it is determined whether the designated folder stores files containing data to be decrypted and expanded when the file is read, referring to the tables shown in FIGS. 9 and 10. In the file attribute checking step, it is determined whether a required file handling flag is set as an attribute value of the designated file in the attribute table. In this manner, it is determined whether a read process can be performed on the designated file. Since a mode value of 15 is set to the designated folder P in this example, the designated folder is determined to contain files to be decrypted and expanded during the read process. Also, since the file handling flag has been set as a file attribute value in the file open process, it is determined that the required handling flag has already been set to the attribute of the designated file in the attribute table.

After the above checking steps, a mode check is carried out in step S57. In this mode checking step, it is determined whether the selected processing mode is a mode for decrypting and expanding data when the file is read. Since the mode value is 15 in this example, the selected processing mode is determined to be a mode for decrypting and expanding data when the file is read.

In step S58, the driver outputs a request to the hard disk drive unit 18 to read the data from the designated file. Upon receipt of the request, the hard disk drive unit 18 reads the data of the designated file from the hard disk 20 through a boundary process, and passes the data to the driver in step S59. The data has been already encrypted and compressed in accordance with a predetermined algorithm described later.

After receiving the data from the hard disk drive unit 18, the driver decrypts the data in step S60. In this decrypting step, the data is decrypted and expanded every 8 bytes in accordance with an algorithm corresponding to the encrypting and compressing algorithm. Here, a fraction number process is also performed on the data. Each set of 8 bytes in the read data corresponds to each corresponding set of 8 bytes in the decrypted and expanded data, so that the both data cannot be distinguished from each other by different data lengths.

After the decrypting step, the amount of data corresponding to the read size is stored in the read buffer in step S61, and the driver returns to the return address in the file system in step S62. The file system then continues the read process at the return address. After acquiring the data stored in the read buffer, the file system finishes the read process in step S63. The file system then transmits the result of the read process to the application.

Upon receipt of the result, the application returns to the read function in step S64. The application then acquires the read data, and displays the read data on the display unit 16.

If the designated folder is determined in step S55 not to be decrypted and expanded when the file is read, or if the required file handling flag is not set in the attribute of the designated file in the attribute table in step S56, or if the selected processing mode is determined in step S57 not to be a processing mode for decrypting and expanding the data when the file is read, the driver does not perform the decrypting process, and directly returns to the return address in the file system (S47). The file system then transmits the result of the read process to the application.

As described above, when the read function is issued from the application to the file system, the driver automatically carries out the decrypting and expanding process on the data of the designated file to be read, and sends the decrypted and expanded data to the file system. The file system then performs the normal read process, and returns the decrypted and expanded data as the result of the read process to the application. Accordingly, the user can obtain data that has been decrypted and expanded to the original state while an application is in operation, without carrying out any operation to decrypt and expand the encrypted and compressed data.

Figure 7:
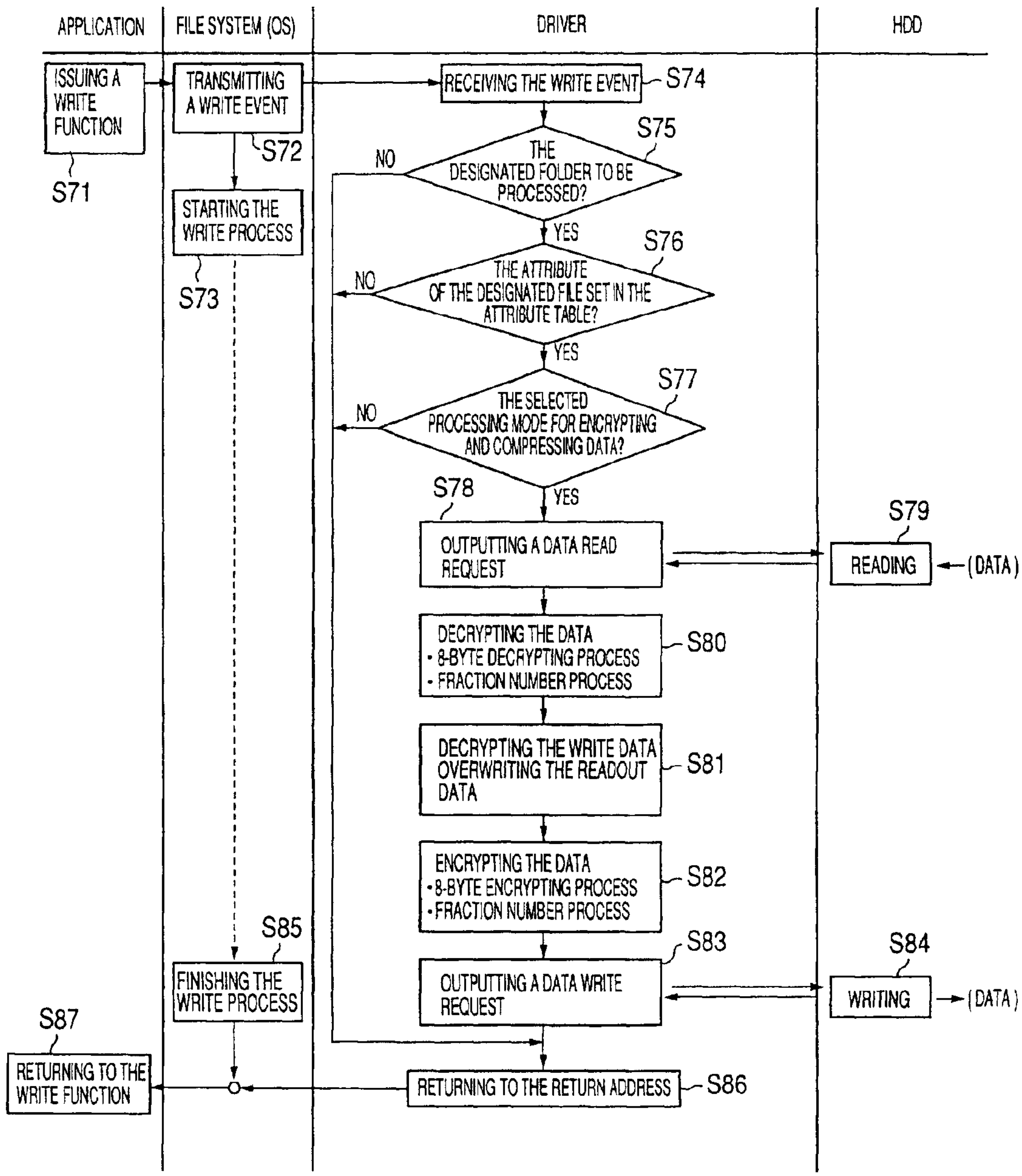
FIG. 7 is a flowchart of an open process carried out among an application, the file system, the driver, and the hard disk drive unit in the system of FIG. 1.

Meanwhile, a write process can be carried out on the file opened in the file open process, in accordance with the procedure shown in FIG. 7.

In step S71, a write function is issued from the application to the file system. Upon receipt of the write function, the file system transmits a write event to the driver in step S72, and starts the write process in step S73. The driver then carries out the subsequent steps. Here, the write event includes: a file name (including a path name); a file handling flag; a write point; write data; a write buffer; write size; and a return address in the file system.

The designated folder is checked in step S75 in the same manner as in the file open process and the read process, and the file attribute is checked in step S76. In the folder checking step, it is determined whether the designated folder stores files containing data to be encrypted and compressed when data is written in the designated file, referring to the tables shown in FIGS. 9 and 10. In the file attribute checking step, it is determined whether a required file handling flag is set as an attribute value of the designated file in the attribute table. In this manner, it is determined whether a write process can be performed on the designated file. Since a mode value of 15 is set to the designated folder P in this example, the designated folder is determined to contain files to be encrypted and compressed during the write process. Also, since the file handling flag has been set as a file attribute value in the file open process, it is determined that the required handling flag has already been set to the attribute of the designated file in the attribute table.

After the above checking steps, a mode check is carried out in step S77. In this mode checking step, it is determined whether the selected processing mode is a mode for encrypting and compressing data when data is written in the designated file. Since the mode value is 15 in this example, the selected processing mode is determined to be a mode for encrypting and compressing data when data is written in the designated.

In step S78, the driver outputs a request to the hard disk drive unit 18 to read the data from the designated file. Upon receipt of the request, the hard disk drive unit 18 reads the data of the designated file from the hard disk 20 through a boundary process, and passes the data to the driver in step S79. The data has been already encrypted and compressed in accordance with a predetermined algorithm described later.

After receiving the data from the hard disk drive unit 18, the driver decrypts the data in step S80. In this decrypting step, the data is decrypted and expanded every 8 bytes in accordance with an algorithm corresponding to the encrypting and compressing algorithm. Here, a fraction number process is also performed on the data.

After the decrypting step, the write data is overwritten on the decrypted data in step S81. The write data is then encrypted in step S82. In this encrypting step, the write data is encrypted and compressed every 8 bytes, and a fraction number process is performed in accordance with a predetermined algorithm. Each set of 8 bytes in the encrypted and compressed write data corresponds to each corresponding set of 8 bytes in the previously encrypted and expanded data, so that the both data cannot be distinguished from each other by different data lengths.

After the encrypting step, the driver outputs a write request to the hard disk drive unit 18 in step S83. In response to the request, the hard disk drive unit 18 writes the encrypted and compressed data in the designated file in the hard disk 20 through a boundary process, and sends a response to the driver in step S83.

After the encrypted and compressed data is written, the driver returns to the return address in the file system in step S86. The file system finishes the write process in step S85, and after the returning step (S86), passes the result of the write process to the application.

Upon receipt of the result, the application returns to the write function in step S87.

If the designated folder is determined in S75 not to be encrypted and compressed when data is written in the file, or if the required file handling flag is not set in the attribute of the designated file in the attribute table in step S76, or if the selected processing mode is determined in step S77 not to be a processing mode for encrypting and compressing the data when the file is read, the driver does not perform the encrypting process, and directly returns to the return address in the file system (S87). The file system then passes the write data from the application to the hard disk drive unit 18, so that the write data is written in the designated file in the hard disk 20.

As described above, when the write function is issued from the application, the driver automatically carries out the encrypting and compressing process on the write data, and writes the encrypted and compressed data into the designated file. The file system then sends the result of the read process to the application. Accordingly, the encrypted and compressed data is stored in the designated file with any application in operation, without the user performing an operation to encrypt and compress the data.

Figure 8:
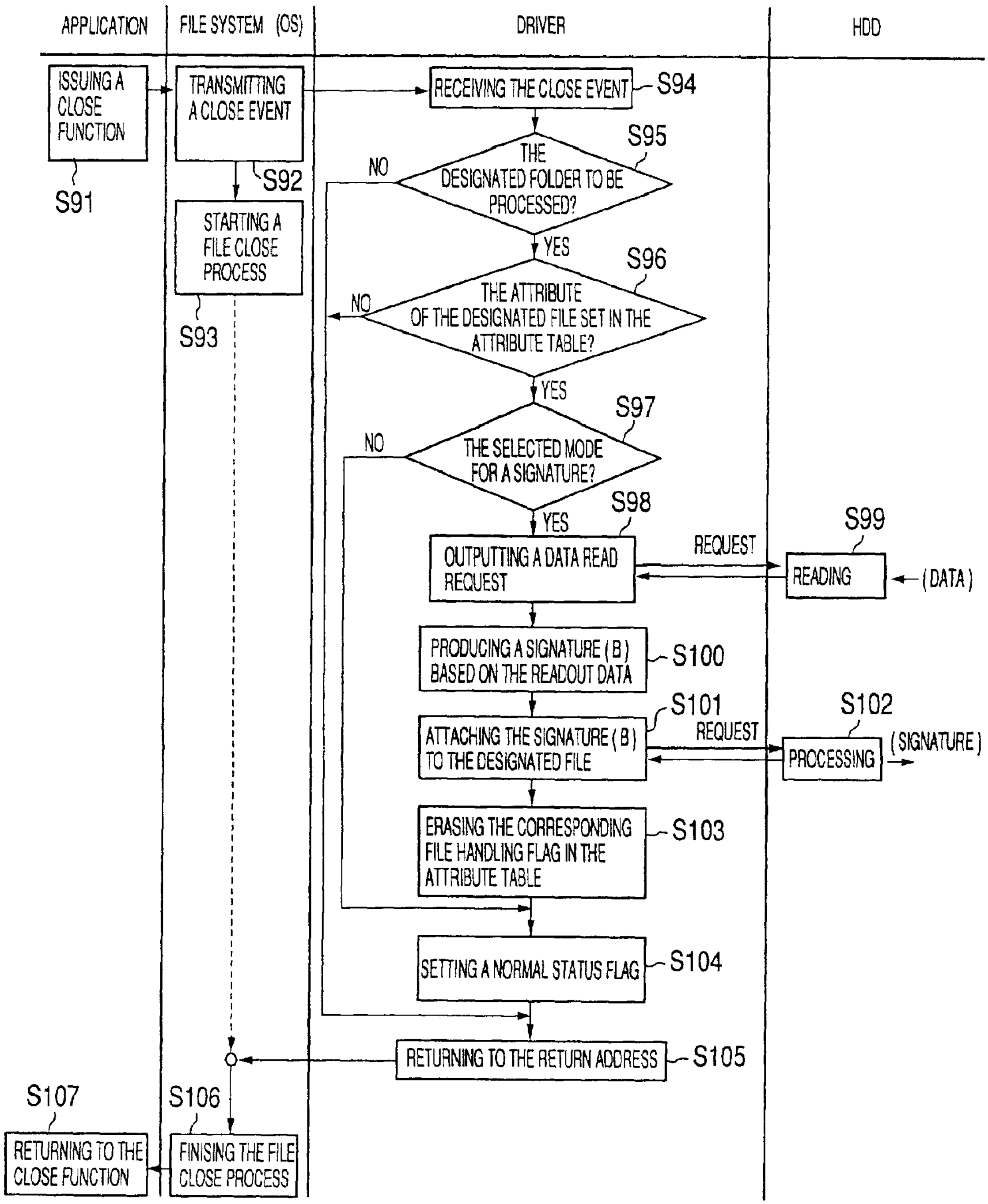
FIG. 8 is a flowchart of a file close process carried out among an application, the file system, the driver, and the hard disk drive unit in the system of FIG. 1.

A file close process can be carried out on the file opened in the file open process, in accordance with the procedure shown in FIG. 8.

In step S91, a close function is issued from the application in accordance with an operation from the user. The close function is sent to the file system. The file system then transmits a close event to the driver in step S92, and starts the file close process in step S93. The close event includes: a file name (including a path name); file attribute; and a return address in the file system.

The driver receives the close event from the file system in step S94, and carries out the subsequent steps.

The designated folder is checked in step S95 in the same manner as in the file open process, and the file attribute is checked in step S96. In the folder checking step, it is determined whether the designated folder stores files containing data to be provided with a signature when the designated file is closed, referring to the tables shown in FIGS. 9 and 10. In the file attribute checking step, it is determined whether a required file handling flag is set as an attribute value of the designated file in the attribute table. Since a mode value of 15 is set to the designated folder P in this example, the designated folder P is determined to contain files to be provided with signature data when the designated file is closed. Also, since the file handling flag has been set as a file attribute value in the file open process, it is determined that the required handling flag has already been set to the attribute of the designated file in the attribute table.

After the above checking steps, a mode check is carried out in step S97. In this mode checking step, it is determined whether the selected processing mode is a mode for producing signature data when the file is closed. Since the mode value is 15 in this example. the selected processing mode is determined to be a mode for producing signature data when the file is closed.

In step S98, the driver outputs a request to the hard disk drive unit 18 to read the designated file. In response to the request, the hard disk drive unit 18 reads the data of the designated file from the hard disk 20, and passes the data to the driver in step S99.

After receiving the data from the hard disk drive unit 18, the driver produces signature data (B) using all of or a part of the data in accordance with the predetermined rule in step S100. The driver then outputs a request to the hard disk drive unit 18 to attach the signature data (B) to the designated file in step S101. The hard disk drive unit 18 then stores the signature data (B) in a predetermined region that is not the data region of the designated file in step S102.

After outputting the request to the hard disk drive unit 18 to attach the signature data (B) to the designated file, the driver erases the file handling flag corresponding to the designated file in the attribute table in step S103. A normal status is then set in step S104. The driver passes the normal status to the file system, and returns to the return address in the file system in step S105.

The file system then continues the file close process at the return address. After confirming the normal status sent from the driver, the file system finishes the file close process in step S106. The result of the file close process is then passed to the application.

Upon receipt of the result of the file close process, the application returns to the close function in step S107. As a result, the file designated by the user in the application is closed.

If it is determined in step S95 that the processing mode for producing signature data when the file is closed is not set to the designated folder, or if it is determined in step S96 that a file handling flag corresponding to the designated file has not been set, the driver does not produce the signature data (B), and directly returns to the return address in the file system in step S105.

If the selected processing mode is not a mode for producing signature data when the file is closed (i.e., when the mode value is 0, 1. 2, 3. 8, 9, 10, or 11), the driver sets the normal status in step S104, and returns to the return process in the file system in step S105.

As described above, when the close function is issued from the application in accordance with an operation of the user, the driver automatically produces the signature data (B), and attaches the signature data (B) to the designated file. The designated file is then closed. Accordingly, the designated file provided with the signature data can be closed with any application in operation, without the user taking the trouble of producing the signature.

In the above example, the selected processing mode (the mode value is 15, as shown in FIG. 10) is for checking signature data when a file open event is issued, decrypting and expanding encrypted and compressed data when a read event is issued, encrypting and compressing data when a write event is issued, and producing signature data when a file close event is issued. In any other mode, at least one of the processes is performed.

For example, where decrypted and compressed file data is supplied from a medium such as a CD-ROM, the mode value 1 may be set. In this case, when a read event is issued after the file is opened, the encrypted and compressed file data is automatically decrypted and expanded, so that the user can use the file data.

For another example, to encrypt and compress file data and store it in a medium such as a floppy disk to be supplied to another system, the mode value 2 may be set. In this case, when a write event is issued after the file is opened, the data of the file is automatically encrypted and compressed, and is then stored in a medium such as a floppy disk.

For yet another example, where signature data attached to a file is stored in a medium such as a floppy disk to be supplied to another system, the mode value 3 may be set. In this case, processes based on read and write events are performed after the file is opened, and, when a file close event is issued, signature data is automatically attached to the file to be closed.

For further example, where a file having signature data is supplied by a medium such as a CD-ROM, the mode value 4 may be set. In this case, when a file open event is issued, signature data is automatically produced based on the data in the file to be opened, and is compared with the signature data already affixed to the file to be opened. If both signature data are identical, the user is allowed to use the data in the file.

In the foregoing description, the signature data is stored in a region different from the data region for a file designated by a file close request. However, it is also possible to store the signature data in another file, and correlate the signature data file with the designated file before storing them in a storage unit, such as the hard disk 20.

Although the storage unit for storing files is the hard disk 20 in the foregoing description, it is possible to use another storage device suitable for a computer system. In a processing mode for only either checking signature data or decrypting and expanding data (the mode value is 1, 8, or 9), a read-only recording medium, such as a CD-ROM, can be used as a storage unit.

In the foregoing description, the driver that embodies the file processing unit of the present invention is contained in the PC card 100. However, the driver may be contained in an IC card or the like. Also, the driver may be embodied in a program to be executed in a computer system.

The present invention is not limited to the specifically disclosed embodiments, but variations and modifications may be made without departing from the scope of the present invention.

The present application is based on Japanese priority application No. 11-125010, filed on Apr. 30, 1999, the entire contents of which are hereby incorporated by reference.

What is claimed is:

1. A file processing unit comprising:

a first signature information producing unit that produces first signature information, in response to a close request to close a file, using the data of the file in accordance with a predetermined rule, the file being used in an application that is run in a computer system;

a signature information storage control unit that correlates the first signature information with the file designated by the close request, and stores the first signature information in a storage unit; and a folder determining unit for determining whether or not a folder that is designated corresponds to a folder for which predetermined signature processing should be performed on a file stored therein.

2. The file processing unit as claimed in claim 1, wherein the first signature information producing unit has a close-file reading unit that reads the data of the designated file from the storage device, so that the first signature information is produced using the data read out by the close-file reading unit.

3. The file processing unit as claimed in claim 1, wherein the signature information storage control unit has a signature information attaching unit that attaches the first signature information to the file designated by the close request, so that the first signature information and the designated file are collectively stored in the storage unit.

4. The file processing unit as claimed in claim 1, further comprising a signature attachment determining unit that determines whether signature information should be attached to the file designated by the close request when the close request is issued, wherein, when the signature attachment determining unit determines that signature information should be attached to the file designated by the close request, the first signature information producing unit produces the first signature information.

5. The file processing unit as claimed in claim 4, further comprising a mode setting unit that sets a processing mode for attaching signature information at least to the file designated by the close request before the file is used in the application, wherein the signature attachment determining unit that determines whether signature information should be attached to the file designated by the close request in accordance with the processing mode preset by the mode setting unit.

6. The file processing unit as claimed in claim 1, further comprising:

a second signature information producing unit that produces second signature information in response to an open request to open the file to be used in the application, using the data of the file in accordance with the predetermined rule;

a signature agreement determining unit that determines whether the first signature information attached to the file designated by the open request is identical to the second signature information; and a determination result producing unit that produces information representing a determination result of the signature agreement determining unit, the information being supplied to the application.

7. The file processing unit as claimed in claim 6, wherein the second signature information producing unit has an open-file reading unit that reads the data of the file designated by the open request from the storage unit before a process requested by the open request is completed, so that the second signature information is produced using the data read out by the open-file reading unit.

8. The file processing unit as claimed in claim 6, further comprising a signature check determination unit that determines whether the first signature information attached to the file designated by the open request and stored in the storage unit should be checked when the open request is issued, wherein, when the signature check determining unit determines that the first signature information attached to the file designated by the open request and stored in the storage unit should be checked, the second signature information producing unit produces the second signature information to be compared with the first signature information.

9. The file processing unit as claimed in claim 8, wherein the signature check determining unit comprises:

a mode setting unit that sets a processing mode for checking at least the first signature information attached to the file designated by an open request before the file is used in the application; and a mode determining unit that determines whether the first signature information attached to the file designated by the open request and stored in the storage unit should be checked, in accordance with the processing mode preset by the mode setting unit.

10. A file processing unit comprising:

a second signature information producing unit that produces second signature information, in response to an open request to open a file, using the data of the file in accordance with a predetermined rule, the file being used by an application that is run in a computer system;

a signature agreement determining unit that determines whether the second signature information is identical to first signature information produced utilizing the data of the file designated by the open request and stored, attached to the designated file, in a storage unit;

a determination result producing unit that produces information representing a determination result of the signature agreement determining unit, the information being supplied to the application; and a folder determining unit for determining whether or not a folder that is designated corresponds to a folder for which predetermined signature processing should be performed on a file stored therein.

11. The file processing unit as claimed in claim 10, wherein the second signature information producing unit has an open-file reading unit that reads the data of the file designated by the open request from the storage unit before a process requested by the open request, so that the second signature information is produced using the data read out by the open-file reading unit.

12. The file processing unit as claimed in claim 10, further comprising a signature check determining unit that determines whether the first signature information attached to the file designated by the open request and stored in the storage unit should be checked when the open request is issued, wherein, when the signature check determining unit determines that the first signature information attached to the file designated by the open request and stored in the storage unit should be checked, the second signature producing unit produces the second signature information to be compared with the first signature information.

13. The file processing unit as claimed in claim 12, wherein the signature check determining unit comprises:

a mode setting unit that sets a processing mode for checking at least the first signature information attached to the file designated by the open request before the file is used in an application; and a mode determining unit that determines whether the first signature information attached to the file designated by the open request and stored in the storage unit should be checked, in accordance with the processing mode preset by the mode setting unit.

14. A file processing unit that is applied to a computer system having a file system that performs processes on a file based on an event issued from an application, said file processing unit comprising:

a first signature information producing unit that produces first signature information in accordance with a predetermined rule using the data of the file designated by a file close event issued from the application, before the process specified by the file close event is completed in the file system;

a signature information storage control unit that attaches the first signature information to the file designated by the file close event, and stores the first signature information in a storage unit;

a first returning unit that performs, after the first signature information is produced, a process for returning to the process for the file specified by the file close event in the file system; and a folder determining unit for determining whether or not a folder that is designated corresponds to a folder for which predetermined signature processing should be performed on a file stored therein.

15. A file processing unit that is applied to a computer system having a file system that performs processes on a file based on an event issued from an application, said file processing unit comprising:

a second signature information producing unit that produces second signature information in accordance with a predetermined rule using the data of the file designated by a file open event issued from the application, before the process specified by the file open event is completed in the file system;

a signature agreement determining unit that determines whether the second signature information is identical to first signature information produced in accordance with the predetermined rule using the data of the file designated by the file open event and stored, together with the designated file, in a storage unit;

a determination result producing unit that produces information representing a determination result of the signature agreement determining unit, the information being supplied to the application;

a second returning unit that passes the information representing the determination result to the file system, and performs a process for returning to the process for the file specified by the file open event in the file system; and a folder determining unit for determining whether or not a folder that is designated corresponds to a folder for which predetermined signature processing should be performed on a file stored therein.

16. A file processing unit comprising:

a first signature information producing unit that produces first signature information, in response to a close request to close a file, using the data of the file in accordance with a predetermined rule, the file being used in an application that is run in a computer system;

a signature information storage control unit that correlates the first signature information with the file designated by the close request, and stores the first signature information in a storage unit, the file processing unit functioning as an external unit connected to the computer system; and a folder determining unit for determining whether or not a folder that is designated corresponds to a folder for which predetermined signature processing should be performed on a file stored therein.

17. The file processing unit as claimed in claim 16, wherein the external unit is constituted by a PC card.

* * * * *